United States Patent [19]
Vickers et al.

[11] Patent Number: 5,192,567
[45] Date of Patent: Mar. 9, 1993

[54] GLOSSY COATED FRIED AND BAKED FOODS AND METHOD FOR MAKING

[75] Inventors: Lisa A. Vickers, Aurora; Annette P. Zyck, North Riverside; Donald T. Komora, Palatine; Mary P. Kirby, Palos Heights; Donald B. Bernacchi, Chicago, all of Ill.

[73] Assignee: Griffith Laboratories Worldwide, Inc., Alsip, Ill.

[21] Appl. No.: 823,198

[22] Filed: Jan. 21, 1992

[51] Int. Cl.⁵ .......................... A23L 1/31; A23L 1/315
[52] U.S. Cl. ..................................... 426/92; 426/295; 426/296; 426/644; 426/652
[58] Field of Search .............. 426/289, 295, 296, 644, 426/652, 92, 641, 643

[56] References Cited

U.S. PATENT DOCUMENTS

| | | | |
|---|---|---|---|
| 3,615,647 | 10/1971 | Kassens | 426/923 |
| 3,653,924 | 4/1972 | Penton | 426/644 X |
| 4,940,590 | 7/1990 | Williams et al. | 426/644 X |
| 4,948,608 | 8/1990 | Stypula et al. | 426/92 X |
| 4,981,707 | 1/1991 | Morris | 426/295 X |

FOREIGN PATENT DOCUMENTS

| | | | |
|---|---|---|---|
| 0306000 | 3/1989 | European Pat. Off. | 426/92 |
| 126940 | 6/1987 | Japan | 426/289 |

*Primary Examiner*—Arthur L. Corbin
*Attorney, Agent, or Firm*—Laff, Whitesel, Conte & Saret

[57] ABSTRACT

A glossy coating for fried and baked foods comprising gum arabic, tapioca dextrin and xanthan gum, in a dry blend, which is applied to a heated food substrate, preferably immediately after frying or baking.

4 Claims, No Drawings

GLOSSY COATED FRIED AND BAKED FOODS AND METHOD FOR MAKING

BACKGROUND OF THE INVENTION

Consumers develop preferences for particular types of food based on appearance and texture. Once they grow accustomed to glossy appearances and textures in, for example, sauce-coated fried or baked chicken, they come to expect and demand that these characteristics be present in all sauce-coated fried or baked chicken.

Such glossy appearances and textures have typically been provided in the prior art by the application of liquid-based glazes. The use of such glazes is labor intensive, since the glazes must be carefully applied to avoid waste and mess from dripping and splattering both during initial application and when the coated substrate is heated to set the glaze. Additionally, such glazes contain water which means that users must pay for shipping water, an uneconomical practice which is avoided whenever possible in the low margin food industry.

Therefore, it would be highly desireable to provide a new way of producing long-lasting glossy coatings on fried and baked foods which are easy to apply and free of water, and which can deliver a wide range of different flavors along with the desired appearance and textural characteristics.

SUMMARY OF THE INVENTION

This invention relates generally to food coatings and, more particularly, to a new coating and treatment method for fried and baked foods which provides a long-lasting glossy appearance and associated desireable textural and flavor characteristics. This invention also relates to fried and baked foods bearing the new coating.

The coating comprises a dry blend of a minimum of three ingredients in specific weight ratios, as described below. The blend is applied in its dry form to the chicken or other food substrate shortly after frying or baking, so that the hot moisture brought up to the surface of the fried or baked product will solubilize the dry blend, producing the desired glossy appearance and, as a side benefit, helping to retain external moisture or juiciness in the product as well as texture. The dry blend may be used with other ingredients for flavoring the chicken.

The actual quantity of the blend which is to be applied on a particular substrate must be determined on a case-by-case basis. For example, some ingredients act as dulling or drying agents and may require adjustments in the ratios of the three components of the blend to achieve the desired endproduct.

DETAILED DESCRIPTION OF THE INVENTION

The coating of the present invention comprises a dry blend of the following three ingredients: gum arabic, tapioca dextrin and xanthan gum. The level of gum arabic in the blend should be about 20–49.9 percent by weight, the level of tapioca dextrin in the blend should be about 50–75 percent by weight, and the level of xanthan gum in the blend should be about 0.1–5.0 percent by weight. In one particularly preferred embodiment of the invention, the dry blend will comprise about 39.2 percent by weight gum arabic, about 58.8 percent by weight, tapioca dextrin and about 2.0 percent by weight xanthan gum.

The blend may be used with both breaded and unbreaded food substrates. It may be applied to any food substrates that are to be fried or baked. These include poultry, meat, seafood, fish, cheese, vegetables and fruit, prepared foods and snack foods.

The dry blend may be applied to the substrate using such techniques as sprinkling, shaking or rolling it onto the surface of the fried or baked chicken or other fried or baked food substrate. Conventional breading application apparatus may be used to apply the blend. When, for example, chicken is the substrate, it has been found that the internal temperature of the chicken should be in the range of about 160–170° F. just before application of the dry blend. There is no further processing required at this point to achieve the glossy surface appearance, which comes up shortly after application of the dry blend.

In alternate embodiments, the blend may be sprinkled onto the food substrate and the substrate either subjected to microwave cooking to release moisture or treated in a high humidity/high temperature chamber, to deposit moisture from the surroundings onto the substrate, thereby solubilizing the blend.

EXAMPLES

The following examples are intended to be illustrative of the invention and to teach one of ordinary skill in the art how to make and use the invention. These examples are not intended to limit the invention or its protection in any way.

EXAMPLE 1

A series of chicken parts were coated with a conventional flour-based breading followed by parfrying and freezing. The coated chicken parts were then fully fried to achieve an internal temperature of 165° F. Immediately after the chicken parts emerged from the fryer, a dry blend comprising 60 percent by weight of a conventional barbecue flavoring mix and 40 percent by weight of a blend of the following three ingredients wa sprinkled onto the fried chicken surface:

gum arabic: 39.2% by weight
tapioca dextrin: 58.8% by weight
xanthan gum: 2.0% by weight Within seconds, a glossy surface coating appeared on the chicken parts.

The chicken parts were then stored under heat lamps for two hours and examined. The glossy surface remained.

Chicken parts were also prepared as described above, but the application of the dry blend of gum arabic, tapioca dextrin and xanthan gum was omitted. After storage under the conditions set forth above, the chicken was found to lack the desired glossy appearance and to be of significantly diminished organoleptic appeal.

While the present invention is described above in connection with preferred or illustrative embodiments, the embodiments are not intended to be exhaustive or limiting of the invention. Rather, the invention is intended to cover all alternatives, modifications and equivalents included within its spirit and scope, as defined by the appended claims.

What we claim is:

1. A method for obtaining a glossy coating on fried and baked foods comprising applying to a heated fried or baked food substrate a blend of about 20 to 49.9 percent by weight gum arabic, about 50 to 75 percent by weight tapioca dextrin and about 0.1 to 5.0 percent by weight xanthan gum.

2. The method of claim 1 wherein the gum arabic is present at a level of about 39.2 percent by weight, the tapioca dextrin is present at a level of about 58.8 percent by weight and the xanthan gum is present at a level of about 2.0 percent by weight.

3. A glossy coated fried or baked food comprising a fried or baked food substrate having a coating comprising a blend of about 20 to 49.9 percent by weight gum arabic, about 50 to 75 percent by weight tapioca dextrin and about 0.1 to 5.0 percent by weight xanthan gum.

4. The glossy coated fried or baked food of claim 3 wherein the gum arabic is present at a level of about 39.2 percent by weight, the tapioca dextrin is present at a level of about 58.8 percent by weight and the xanthan gum is present at a level of about 2.0 percent by weight.

* * * * *